United States Patent
Hay et al.

(10) Patent No.: US 11,977,202 B2
(45) Date of Patent: May 7, 2024

(54) RANGING SOLENOID COIL TRANSMITTER AROUND DOWNHOLE BOTTOM HOLE ASSEMBLY ELEMENTS

(71) Applicant: Halliburton Energy Services, Inc., Houston, TX (US)

(72) Inventors: Charles Richard Thomas Hay, Houston, TX (US); Sean Hinke, Calgary (CA); Pete L. Schiermeier, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 15 days.

(21) Appl. No.: 17/549,126

(22) Filed: Dec. 13, 2021

(65) Prior Publication Data

US 2023/0184985 A1 Jun. 15, 2023

(51) Int. Cl.
*G01V 3/28* (2006.01)
*E21B 49/00* (2006.01)
*G01V 3/38* (2006.01)

(52) U.S. Cl.
CPC .............. *G01V 3/28* (2013.01); *E21B 49/005* (2013.01); *G01V 3/38* (2013.01)

(58) Field of Classification Search
None
See application file for complete search history.

(56) References Cited

U.S. PATENT DOCUMENTS

| | | | |
|---|---|---|---|
| 5,230,387 A | 7/1993 | Waters et al. | |
| 5,265,682 A * | 11/1993 | Russell | E21B 7/06 175/45 |
| 5,566,762 A * | 10/1996 | Braddick | E21B 23/00 166/117.6 |
| 5,923,170 A | 7/1999 | Kuckes | |
| RE36,569 E | 2/2000 | Kuckes | |
| 10,760,414 B1 | 9/2020 | Bargach et al. | |
| 2005/0207279 A1* | 9/2005 | Chemali | E21B 47/135 367/83 |
| 2005/0279513 A1* | 12/2005 | Eppink | E21B 17/10 166/380 |

(Continued)

FOREIGN PATENT DOCUMENTS

CN 101806210 1/2014

OTHER PUBLICATIONS

International Search Report and Written Opinion for Application No. PCT/US2021/063749, dated Sep. 2, 2022.

*Primary Examiner* — Lina Cordero
(74) *Attorney, Agent, or Firm* — Benjamin Ford; C. Tumey Law Group PLLC

(57) ABSTRACT

The disclosure provides for a bottom hole assembly that comprises a stator solenoid winding transmitter assembly operable to generate a magnetic field. The stator solenoid winding transmitter assembly comprises a coil comprising a plurality of windings and a sleeve, wherein the coil is disposed within the sleeve. The bottom hole assembly further comprises a solenoid control assembly disposed adjacent to the stator solenoid winding transmitter assembly, wherein the solenoid control assembly is communicatively coupled to a controller and electrically connected to the coil and a mud motor comprising a rotor and a stator, wherein the stator solenoid winding transmitter assembly is disposed around the mud motor.

20 Claims, 5 Drawing Sheets

(56) References Cited

U.S. PATENT DOCUMENTS

| | | |
|---|---|---|
| 2013/0341092 A1 | 12/2013 | Hay et al. |
| 2014/0111210 A1* | 4/2014 | Fang .................... E21B 47/022 |
| | | 324/346 |
| 2015/0015265 A1 | 1/2015 | Seydoux et al. |
| 2016/0115738 A1* | 4/2016 | Samuel .................... E21B 4/02 |
| | | 175/57 |
| 2018/0142548 A1 | 5/2018 | Donderici et al. |

* cited by examiner

— RANGING SOLENOID COIL TRANSMITTER AROUND DOWNHOLE BOTTOM HOLE ASSEMBLY ELEMENTS

TECHNICAL FIELD OF THE INVENTION

The present disclosure relates generally to well operations and, more particularly, to systems and methods of solenoid coil transmitters disposed around bottom hole assembly elements.

BACKGROUND

Geothermal energy production is a form of energy that utilizes geothermal heat. Geothermal heat originating from the earth's core is a "renewable" source of energy. Briefly, the magma existing below the earth's crust heats nearby rocks and water, and hot geothermal effluent comprised of water and steam travels through faults and cracks to the earth's surface as geysers.

However, most hot geothermal water and heat stays deep underground trapped in geothermal reservoirs and must be brought to the surface via a drilled production well if it is to be productively used. A geothermal power plant is a thermal plant which uses the heat from geothermal reservoirs as its principal source for generation of electrical power. The geothermal effluent is heated in the geothermal reservoir and subsequently produced to the surface to power the geothermal power plant. The geothermal effluent most commonly used is water, which, in some applications, can phase transition into steam during the heat extraction process from the geothermal reservoir.

Geothermal power plants may be identified in the ways in which the geothermal power plant utilize this hot water/ steam in geothermal reservoirs as a geothermal effluent. A "dry" steam reservoir produces steam, but very little water. This steam is piped directly to a "dry" steam power plant to provide the force to spin a turbine generator. A second kind of plant, called a "flash" power plant, taps into a geothermal reservoir that produces mostly hot water ranging in temperatures between 200° F. and 300° F. This high temperature water is brought to the surface and, once released from the pressure of the reservoir, flashes into steam in a separator. The steam is then used to drive an adjacent turbine. In a third kind of plant, called a "binary" power plant, geothermal effluent between 250-360° F. is passed through a heat exchanger where its heat is transferred to a second (binary) liquid that boils at a lower temperature than the effluent. When heated, the binary liquid flashes to vapor which expands and spins turbine blades.

To more efficiently extract heat from geothermal reservoirs, the reservoirs are often fractured in order to provide enhanced fluid communication through the resulting fracture networks. The permeability of the resulting fracture network directly affects the heat transfer capability of the geothermal effluent as it circulates therethrough. What is needed is an intelligent means of extracting heat from fracture networks defined in geothermal reservoirs, and thereby provide a steady source of heat to a power plant arranged at the surface.

Closed loop geothermal wells require understanding relative placement between wellbores. At times, multiple wells may be drilled at the same time and relative position between them is required at all times. To identify relative position between geothermal wells, a source device and/or a receiver device are placed into one or more offset wellbore. This is often costly and time consuming at additional wells, which do not contribute to the removal of geothermal energy, are drilled.

BRIEF DESCRIPTION OF THE DRAWINGS

These drawings illustrate certain aspects of some of the embodiments of the present disclosure and should not be used to limit or define the claims.

Figure 1:
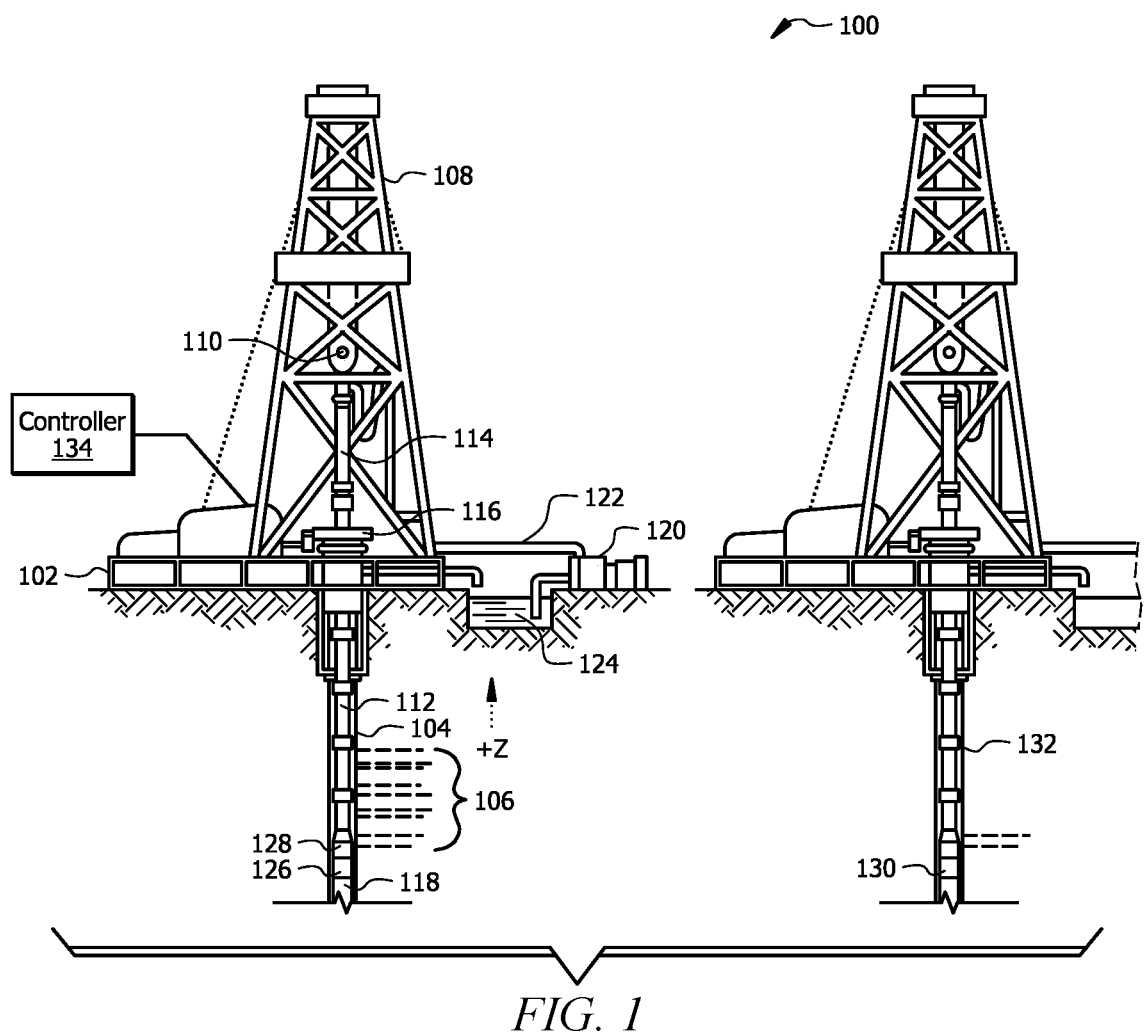
FIG. 1 is a schematic diagram of a drilling system at a well site, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments described below with respect to one implementation are not intended to be limiting.

The terms "couple" or "couples," as used herein, are intended to mean either an indirect or direct connection. Thus, if a first device couples to a second device, that connection may be through a direct connection, or through an indirect electrical connection or a shaft coupling via other devices and connections. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The present disclosure provides for systems and methods for drilling multiple wells in close proximity without the need for specific offset wells in which a transmitter device and/or receiver device are disposed for tracking drilling operations. While methods and systems described below discuss geothermal wellbore operations, it should be noted that the methods and systems may be applied to any form of drilling operation for hydrocarbon extraction, water extraction, and/or any form of fluid extraction from a subterranean formation. Systems and methods may eliminate the need to deploy a wireline source and incorporates a bottom hole assembly (BHA) mounted source and a (BHA) mounted receiver in a target well and offset well with the target well as an actively drilled well or a cased or open hole well.

FIG. 1 is a schematic diagram of an exemplary drilling system 100 that may employ the principles of the present disclosure, according to one or more embodiments. As illustrated, the drilling system 100 may include a drilling platform 102 positioned at the surface and a first wellbore 104 that extends from the drilling platform 102 into one or more subterranean formations 106. In other embodiments, such as in an offshore drilling operation, a volume of water may separate the drilling platform 102 and the first wellbore 104. Even though FIG. 1 depicts a land-based drilling platform 102, it will be appreciated that the embodiments of the present disclosure are equally well suited for use in other types of drilling platforms, such as offshore platforms, or rigs used in any other geographical locations. It should be noted that, although FIG. 1 depicts the wellbores of the drilling system 100 as being arranged in a generally vertical configuration, those skilled in the art will readily recognize that drilling system 100 is equally well suited for use in wells having other directional configurations including horizontal wells, deviated wellbores, slanted wells, multilateral wells, combinations thereof, and the like. Accordingly, the use of directional terms such as above, below, upper, lower, upward, downward, left, right, uphole, downhole and the like are used herein in relation to the illustrative embodiments as they are depicted in the figures; the upward direction being toward the top of the corresponding figure and the downward direction being toward the bottom of the corresponding figure; the uphole direction being toward a surface of the well and the downhole direction being toward the toe of the well.

The drilling system 100 may include a derrick 108 supported by the drilling platform 102 and having a traveling block 110 for raising and lowering a conveyance 112, such as a drill string. A kelly 114 may support the conveyance 112 as it is lowered through a rotary table 116. A drill bit 118 may be coupled to the conveyance 112 and driven by a downhole motor and/or by rotation of the conveyance 112 by the rotary table 116. As the drill bit 118 rotates, it creates the first wellbore 104, which penetrates the subterranean formations 106. A pump 120 may circulate drilling fluid through a feed pipe 122 and the kelly 114, downhole through the interior of conveyance 112, through orifices in the drill bit 118, back to the surface via the annulus defined around conveyance 112, and into a retention pit 124. The drilling fluid cools the drill bit 118 during operation and transports cuttings from the wellbore 104 into the retention pit 124. The drilling system 100 may further include a bottom hole assembly (BHA) (i.e., BHA 300 as illustrated in FIG. 3) coupled to the conveyance 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one stator solenoid winding transmitter assembly 126, which may be operable to generate a magnetic field into the surrounding one or more subterranean formations 106. The stator solenoid winding transmitter assembly 126 may be protected by a sleeve within the conveyance 112 as discussed below with respect to FIG. 3.

As the drill bit 118 extends the first wellbore 104 through the formations 106, the stator solenoid winding transmitter assembly 126 may continuously or intermittently generate a magnetic field to be received by a receiver 130. In embodiments, the receiver 130 may be disposed within a BHA disposed in a second wellbore 132, wherein the receiver 130 is operable to measure a distance from the stator solenoid winding transmitter assembly 126 based, at least in part, on the generated magnetic field. The stator solenoid winding transmitter assembly 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the BHA may also be stored within the BHA or the telemetry module 128 for later retrieval at the surface upon retracting the conveyance 112. One of ordinary skill in the art will recognize that the BHA in the second wellbore 132 may comprise a telemetry module operable to transfer measurements (for example, distance measurements) and signals from the BHA to a surface receiver (not shown) and/or to receive commands from the surface receiver. As illustrated, a controller 134 for controlling, processing, storing, and/or visualizing the measurements gathered by the stator solenoid winding transmitter assembly 126 and receiver 130 may be included in the drilling system 100. The controller 134 may be communicably coupled to the BHA housing the stator solenoid winding transmitter assembly 126, and similarly the receiver 130, by way of the conveyance 112. In one or more embodiments, the controller 134 may be disposed about any suitable location in the drilling system 100. In alternate embodiments, controller 134 may be located remotely from the system 100. The controller 134 may be directly or indirectly coupled to any one or more components of the drilling system 100.

Figure 2:
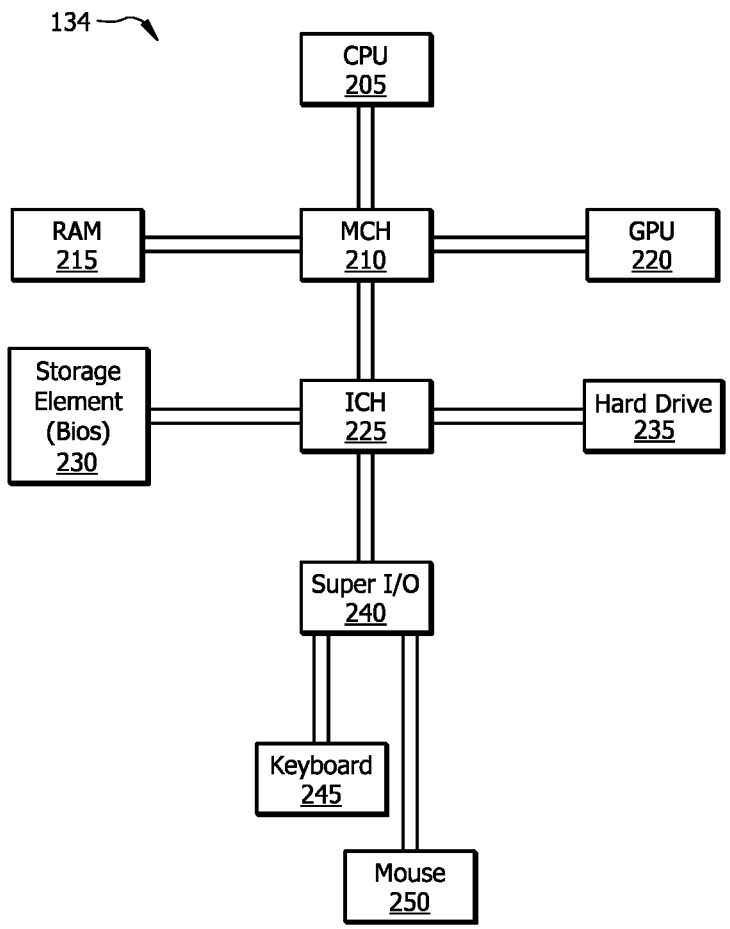
FIG. 2 is a diagram illustrating an example controller, according to aspects of the present disclosure.

FIG. 2 is a diagram illustrating an example controller 134, according to aspects of the present disclosure. A processor or central processing unit (CPU) 205 of the controller 134 is communicatively coupled to a memory controller hub or north bridge 210. The processor 205 may include, for example a microprocessor, microcontroller, digital signal processor (DSP), application specific integrated circuit (ASIC), or any other digital or analog circuitry configured to interpret and/or execute program instructions and/or process data. Processor 205 may be configured to interpret and/or execute program instructions or other data retrieved and stored in any memory such as memory 215 or hard drive 235. Program instructions or other data may constitute portions of a software or application for carrying out one or more methods described herein. Memory 215 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from a software or application may be retrieved and stored in memory 215 for execution by processor 205.

Modifications, additions, or omissions may be made to FIG. 2 without departing from the scope of the present disclosure. For example, FIG. 2 shows a particular configuration of components of controller 134. However, any suitable configurations of components may be used. For example, components of controller 134 may be implemented either as physical or logical components. Furthermore, in some embodiments, functionality associated with components of controller 134 may be implemented in special purpose circuits or components. In other embodiments, functionality associated with components of controller 134 may be implemented in configurable general-purpose circuit or components. For example, components of controller 134 may be implemented by configured computer program instructions.

Memory controller hub (MCH) 210 may include a memory controller for directing information to or from various system memory components within the controller 134, such as memory 215, storage element 230, and hard drive 235. The memory controller hub 210 may be coupled to memory 215 and a graphics processing unit (GPU) 220. Memory controller hub 210 may also be coupled to an I/O controller hub (ICH) or south bridge 225. I/O controller hub 225 is coupled to storage elements of the controller 134, including a storage element 230, which may comprise a flash ROM that includes a basic input/output system (BIOS) of the computer system. I/O controller hub 225 is also coupled to the hard drive 235 of the controller 134. I/O controller hub 225 may also be coupled to a Super I/O chip 240, which is itself coupled to several of the I/O ports of the computer system, including keyboard 245 and mouse 250.

In certain embodiments, the controller 134 may comprise at least a processor and a memory device coupled to the processor that contains a set of instructions that when executed cause the processor to perform certain actions. In any embodiment, the controller 134 may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The controller 134 may include random access memory (RAM), one or more processing resources such as a central processing unit (CPU) or hardware or software control logic, read only memory (ROM), and/or other types of nonvolatile memory. Additional components of the controller 134 may include one or more disk drives, one or more network ports for communication with external devices as well as various input and output (I/O) devices, such as a keyboard, a mouse, and a video display. The controller 134 may also include one or more buses operable to transmit communications between the various hardware components.

Figure 3A:
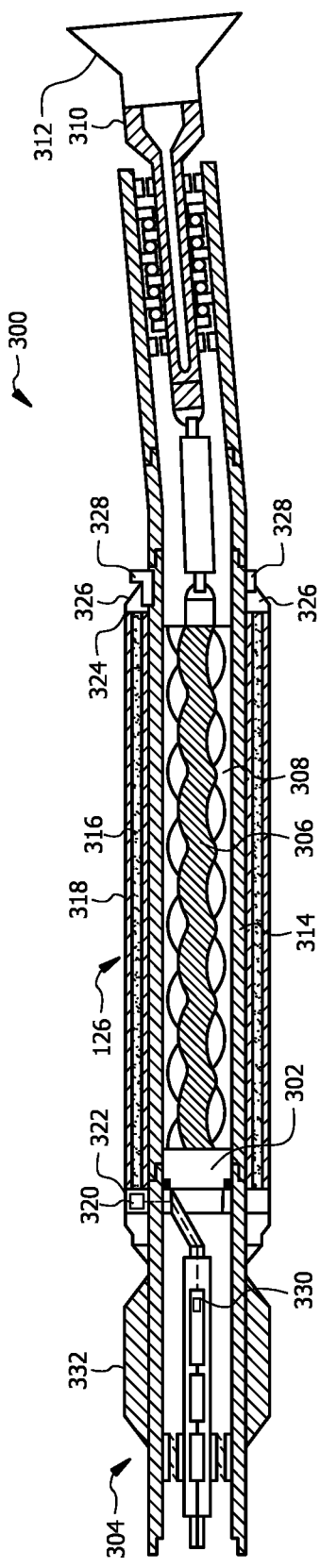
FIG. 3A is a diagram illustrating an example bottom hole assembly, according to aspects of the present disclosure.

FIG. 3A illustrates an example BHA 300. The BHA 300 may comprise any suitable equipment, sensors, electronics, and the like operable to perform one or more operations and/or to take measurements downhole. As illustrated, the BHA 300 may comprise a mud motor 302, the stator solenoid winding transmitter assembly 126, and a solenoid control assembly 304. The mud motor 302 may be operable to convert hydraulic energy of a fluid, such as drilling mud, into mechanical energy in the form of rotational speed and torque output, which may be harnessed for a variety of applications such as downhole drilling. The mud motor 302 may comprise a rotor 306 disposed within a stator 308. A driveshaft 310 may couple the rotor 306 to a drill bit 312 disposed adjacent to the BHA 300. Drilling fluid or mud may be pumped under pressure between the rotor 306 and stator 308, causing the rotor 306, as well as the drill bit 312 coupled to the rotor 306, to rotate relative to the stator 308. In general, the rotor 306 may comprise a rotational speed proportional to the volumetric flow rate of pressurized fluid passing through the mud motor 302.

As illustrated, the mud motor 302 may be disposed within a tubular connection 314 (i.e., a tubular, housing, or drill collar) between the solenoid control assembly 304 and the drill bit 312. The tubular connection 314 may comprise any suitable size, height, shape, and any combinations thereof. Further, the tubular connection 314 may comprise any suitable materials, such as metals, nonmetals, polymers, composites, and any combinations thereof. In one or more embodiments, the mud motor 302 may function as a core for the stator solenoid winding transmitter assembly 126. In these embodiments, the stator solenoid winding transmitter assembly 126 may be disposed around the mud motor 302. As shown in FIG. 3A, the stator solenoid winding transmitter assembly 126 may be disposed external to and around the tubular connection 314. Without limitations, the stator solenoid winding transmitter assembly 126 may be secured to the exterior of the tubular connection 314 through any suitable method, including through the usage of fasteners, adhesives, interlocking components, interference fit, and any combination thereof. In these embodiments, the rotor 306 and/or stator 308 may comprise of ferromagnetic material, such as iron, alloys of steel such as 4140 or 4145, or a combination thereof.

Figure 3B:
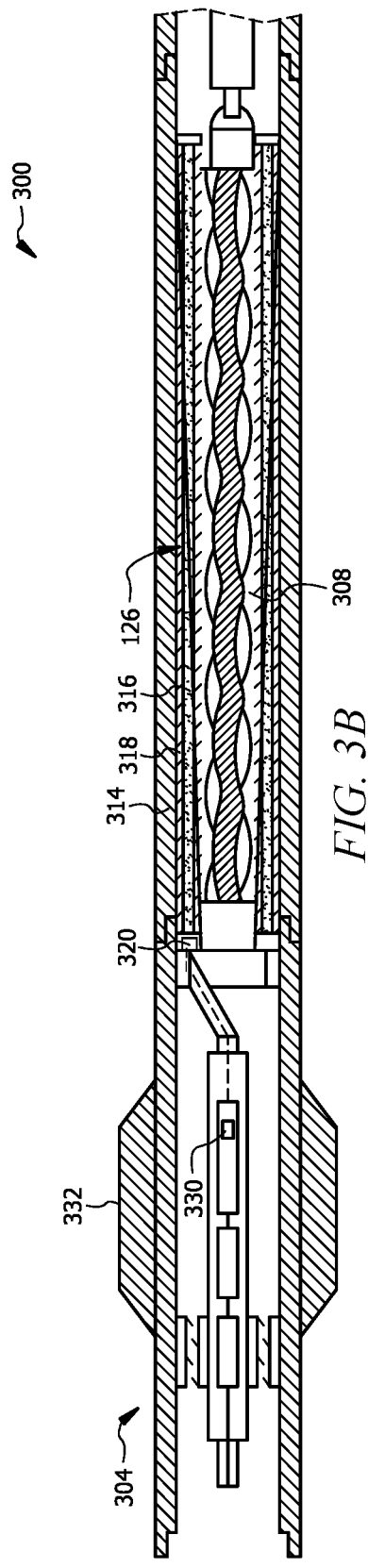
FIG. 3B is a diagram illustrating an example bottom hole assembly, according to aspects of the present disclosure.

With reference now to FIG. 3B, the stator solenoid winding transmitter assembly 126 may be disposed internal to and within the tubular connection 314. Without limitations, the stator solenoid winding transmitter assembly 126 may be secured to the interior of the tubular connection 314 through any suitable method, including through the usage of fasteners, adhesives, interlocking components, interference fit, and any combination thereof. In this embodiment, the stator solenoid winding transmitter assembly 126 may be disposed between the stator 308 and the tubular connection 314. In these embodiments, the rotor 306 may comprise of ferromagnetic material but the stator 308 may comprise of non-magnetic material, such as austenitic stainless steel.

With reference to both FIGS. 3A-3B, the stator solenoid winding transmitter assembly 126 may be operable to generate a magnetic field. The stator solenoid winding transmitter assembly 126 may comprise a coil 316, a sleeve 318, and solenoid protection electronics 320. The coil 316 may be energized by the solenoid control assembly 304 to produce a magnetic field. The coil 316 may comprise any suitable size, height, shape, and any combinations thereof. In one or more embodiments, the coil 316 may comprise a plurality of windings (for example, windings 400 in FIG. 4) configured with a circular cross-section. In embodiments, the coil 316 may comprise a metal wire wherein an electrical current may pass though the metal wire.

As illustrated, the coil 316 may be disposed within the sleeve 318. The sleeve 318 may be operable to house and protect the coil 316 from an external environment. The sleeve 318 may comprise any suitable size, height, shape, and any combinations thereof. Further, the sleeve 318 may comprise any suitable materials, such as metals, nonmetals, polymers, composites, and any combinations thereof. The sleeve 318 may be operable to slide in relation to a component of the BHA 300. In embodiments, the sleeve 318 may slide over the tubular connection 314. In other embodiments, the sleeve 318 may slide over the stator 308 and along an interior of the tubular connection 314. With reference to FIG. 3A, the ends of the sleeve 318 may be secured using any suitable method. For example, a first end 322 of the sleeve 318 may be threaded to form a threaded connection to the solenoid control assembly 304. A second end 324 of the sleeve 318 may also be threaded. In other embodiments, the second end 324 may comprise an end cap 326 operable to be received by a spline 328 disposed along the tubular connection 314. Implementation of threads, end cap 326, spline 328, and any combination thereof may increase resistance of the sleeve 318 from rotating.

With reference back to both FIGS. 3A-3B, the solenoid protection electronics 320 may be operable to control a polarity of the magnetic field generated by the stator solenoid winding transmitter assembly 126. The solenoid protection electronics 320 may be further operable to select one of one or more taps (for example, tap 402 in FIG. 4) disposed on one of the windings of the coil 316. In embodiments, the solenoid protection electronics 320 may comprise any suitable protective circuitry for the stator solenoid winding transmitter assembly 126 to address flyback currents and/or voltages wherein the stator solenoid winding transmitter assembly 126 is acting as a receiver. During operations, the solenoid protection electronics 320 may receive an electrical signal from the solenoid control assembly 304 in order to energize the coil 316.

The solenoid control assembly 304 may be disposed uphole and adjacent to the stator solenoid winding transmitter assembly 126. The solenoid control assembly 304 may control the electrical power supplied to the coil 316. The electrical power supplied to the coil 316 may be electrical current in any suitable mode, such as alternating current, multi-stable current, uni-polar current, and the like. In embodiments, a bi-stable positive and negative current or a sinusoidal current may be used. The electrical current may also be modulated. The solenoid control assembly 304 may be electrically connected to the coil 316 via the solenoid protection electronics 320. In one or more embodiments, the solenoid control assembly 304 may further be communicatively coupled to the controller 134 (referring to FIG. 1). The solenoid control assembly 304 may be operable to communicate with the controller 134 via the telemetry module 128 (referring to FIG. 1), which may be disposed proximate to the solenoid control assembly 304 or within the solenoid control assembly 304. In certain embodiments wherein the stator solenoid winding transmitter assembly 126 is acting as a receiver, the solenoid control assembly 304 may be operable to transmit a signal received by the coil 316 to the controller 134. In embodiments, the solenoid control assembly 304 may comprise any suitable receiver circuitry.

As illustrated, the solenoid control assembly 304 may comprise a magnetometer 330. In embodiments, a magnetic gradiometer sensor arrangement may be used in place of the magnetometer 330. The magnetometer 330 may be operable to receive a generated magnetic field. The solenoid control assembly 304 may be configured to transmit a signal to the controller 134 associated with the received generated magnetic field. In embodiments, the BHA 300 in the second wellbore 132 may receive the generated magnetic field via 2 or 3 orthogonal magnetometers 330 (or magnetic gradiometers), with preferably one axis aligned with the longitudinal axis of the receiver 130 and two other aligned with cross x-axis and y-axis of a plane intersecting the normal of the longitudinal axis of the BHA 300, wherein the magnetometers 330, or magnetic gradiometers, may function as the receiver 130 or the receiver 130 may comprise the magnetometer 330 or magnetic gradiometers. The BHA 300 may transmit the received generated magnetic and/or magnetic gradient field to the controller 134 as an electrical signal for further processing. In addition, the magnetometer 330 (or magnetic gradiometer) may be located elsewhere in the BHA 300, such as adjacent or inside the drill bit 312 or at a location further uphole in the BHA 300 above the solenoid control assembly 304. Further, a plurality of magnetometers 330 (or magnetic gradiometers) may be used, where a each one may be adjacent, embedded, or nested inside or outside the radial diameter of a winding of the coil 316 (for example, windings 404 in FIG. 4). The magnetometers 330 (or magnetic gradiometers), regardless of position may be used for measuring the magnetic field strength of the winding, and the solenoid control assembly 304 may then use this measurement to adjust the power level of electrical energy being fed to the winding to maintain the magnetic field at a desired range or rate of change. Further the magnetometer 330 (or magnetic gradiometer) may be used for receiving magnetic field measurements for ranging measurements from another transmitter proximate to BHA 300 to make ranging measurements to that transmitter. The proximate transmitter may be located in a different borehole than the one that BHA 300 is located in or at a surface location. Such received ranging measurements may then be used to to calculate the distance between BHA 300 and the proximate transmitter. One magnetometer 330 or gradiometer arrangement may be used for receiving transmitted signals from a different transmitter other than that in BHA 300, and a second magnetometer 330 and/or gradiometer may be used for measuring the magnetic field of the transmitter winding. Further, a stabilizer 332 may be disposed around the solenoid control assembly 304. The stabilizer 332 may be any suitable size, height, length, shape, and any combination thereof. The stabilizer 332 may be operable to protect the sleeve 318, and other components of the BHA 300, from contact with a borehole wall (i.e., interior of first wellbore 104 in FIG. 1).

Figure 4:
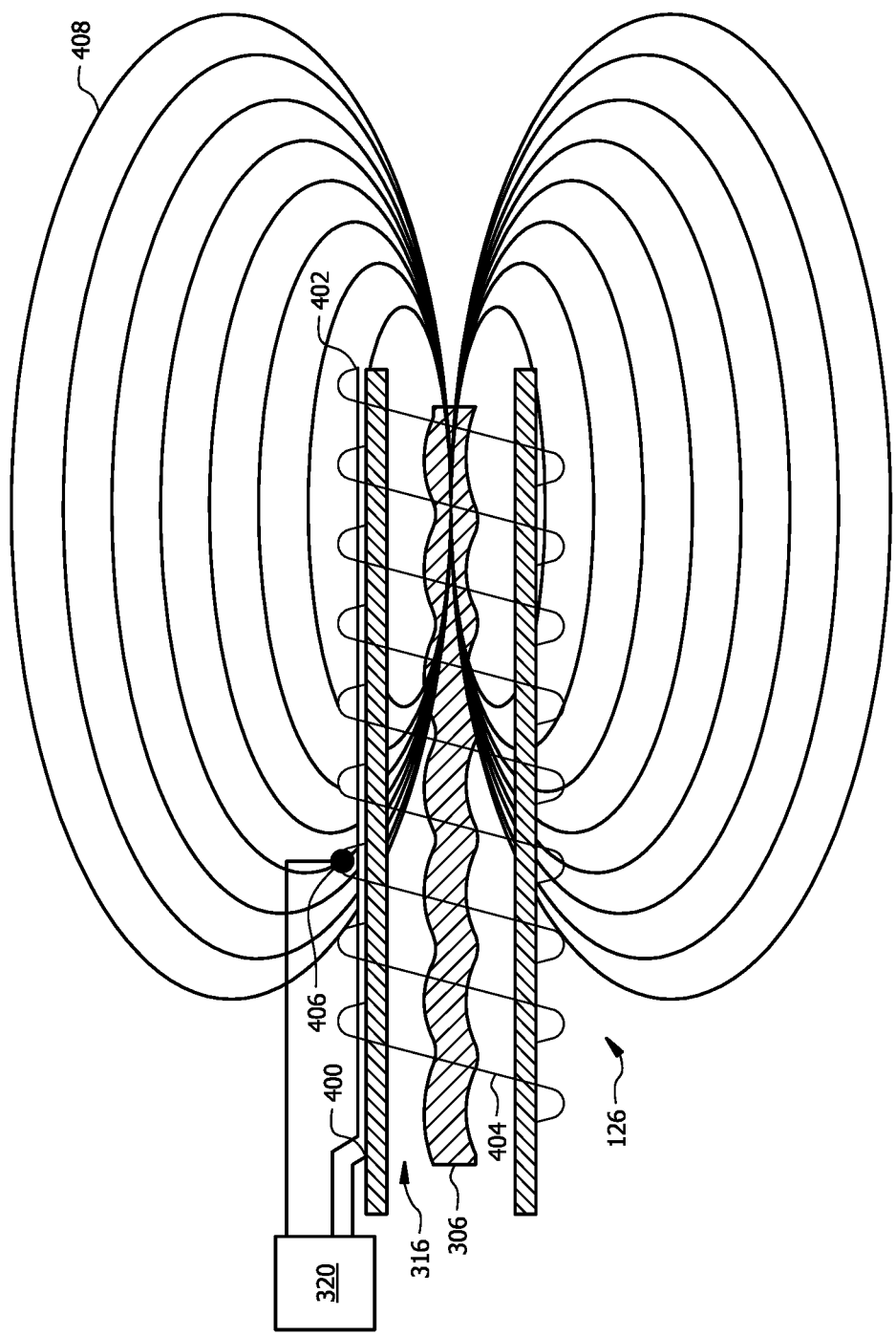
FIG. 4 is a diagram illustrating an example stator solenoid winding transmitter assembly, according to aspects of the present disclosure.

FIG. 4 illustrates an example stator solenoid winding transmitter assembly 126 in operation. As illustrated, the solenoid protection electronics 320 may be electrically coupled to a first end 400 and a second end 402 of the coil 316. The solenoid protection electronics 320 may further couple to any intermediate winding 404 of the coil 316, wherein the coil 316 comprises a plurality of windings 404. There may be a plurality of taps 406, wherein the taps 406 may be access points along the coil 316. For example, the solenoid protection electronics 320 may energize a portion of the plurality of windings 404, such as the windings 404 outgoing to the winding 404 accessible by the tap 406. Alternatively, the solenoid protection electronics 320 may energize all of the plurality of windings 404 starting from the first end 400 of the coil 316. As the coil 316 is energized, a magnetic field 408 may be generated. As illustrated, the rotor 306 of the mud motor 302 (referring to FIG. 3A) may be disposed internal to and concentric with the coil 316. The rotor 306 may function as a core, wherein the current flowing through the coil 316 may magnetize the rotor 306 to increase the generated magnetic field 408. The rotor 306 functioning as the core for the coil 316 may increase the inductance of the stator solenoid winding transmitter assembly 126 and the pole strength of the magnetic field 408. The transmission range may also be increased due to the rotor 306 serving as the core.

Figure 5:
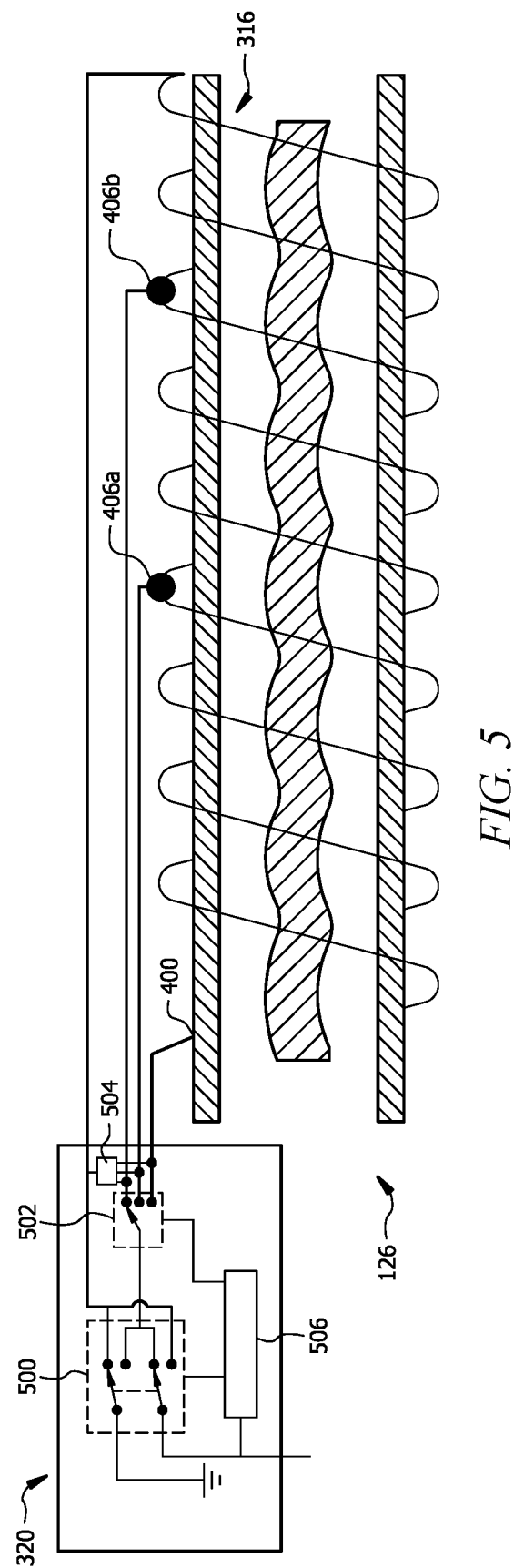
FIG. 5 is a diagram illustrating an example stator solenoid winding transmitter assembly, according to aspects of the present disclosure.

FIG. 5 illustrates an example stator solenoid winding transmitter assembly 126. As illustrated, the solenoid protection electronics 320 may be electrically coupled to the coil 316 via one or more taps 406. Further, the solenoid protection electronics 320 may be grounded to the conveyance 112 (referring to FIG. 1). The solenoid protection electronics 320 may comprise a first switch 500, a second switch 502, a current protector 504, and a controller 506. The first switch 500 may be operable to change the polarity of the generated magnetic field 408 (referring to FIG. 4). During operations, the first switch 500 may be toggled between positions to change the polarity of the magnetic field 408 from positive to negative and/or vice versa. The second switch 502 may be operable to select one of the one or more taps 406 to be energized. For example, a position of the second switch 502 may be associated with the first end 400 of the coil 316, with the tap 406*a*, or with the tap 406*b*. During operations, the second switch 502 may be actuated to toggle between positions in order to energize different portions of the coil 316. For example, the second switch 502 may be in a first position that is associated with the first end 400 of the coil 316. The second switch 502 may be toggled to a second position associated with tap 406*a*, wherein electrical power will flow to tap 406*a* instead of to the first end 400 of the coil 316. In embodiments, the current protector 504 may comprise a thyristor. The current protector 504 may be operable to open the circuit when a current exceeds a threshold. The controller 506 may be function similarly to and comprise equivalent components as controller 134 (referring to FIG. 1).

With reference to FIGS. 1-5, a method as presented in the present disclosure may be described. The BHA 300 may be disposed on the conveyance 112 within the first wellbore 104. A second BHA 300 comprising the receiver 130 may be disposed on a second conveyance 112 within the second wellbore 132. During operations, the method may include drilling the first wellbore 104 and drilling the second wellbore 132. As both the first wellbore 104 and the second wellbore 132 are being drilled out, a distance and/or direction between them may need to be determined. The BHA 300 in the first wellbore 104 may be energized to generate the magnetic field 408. The BHA 300 in the second wellbore 132 may receive the generated magnetic field 408 via 2 or 3 orthogonal magnetometers 330 or magnetic gradiometers, with preferably one axis aligned with the longitudinal axis of the receiver 130 and two other aligned with cross x-axis and y-axis of a plane intersecting the normal of the longitudinal axis of the BHA 300, wherein the magnetometers 330 or magnetic gradiometers may function as the receiver 130 or the receiver 130 may comprise the magnetometers 330 or magnetic gradiometers. The BHA 300 may transmit the received generated magnetic and/or magnetic gradient field 408 to the controller 134 as an electrical signal for further processing. The controller 134 may determine a distance measurement and a direction between the first wellbore 104 and the second wellbore 132 based on the electrical signal. In embodiments, the controller 134 may be operable to steer the drill bit 312 in the first wellbore 104 and/or second wellbore 132 based on the determined distance measurement and direction.

An embodiment of the present disclosure is a bottom hole assembly, comprising: a stator solenoid winding transmitter assembly operable to generate a magnetic field, comprising: a coil comprising a plurality of windings; and a sleeve, wherein the coil is disposed within the sleeve; a solenoid control assembly disposed adjacent to the stator solenoid winding transmitter assembly, wherein the solenoid control assembly is communicatively coupled to a controller and electrically connected to the coil; and a mud motor comprising a rotor and a stator, wherein the stator solenoid winding transmitter assembly is disposed around the mud motor.

In one or more embodiments described in the preceding paragraph, wherein the mud motor is disposed within a tubular connection between the solenoid control assembly and a drill bit, wherein the stator solenoid winding transmitter assembly is disposed external to and around the tubular connection. In one or more embodiments described above, wherein the mud motor is disposed within a tubular connection between the solenoid control assembly and a drill bit, wherein the stator solenoid winding transmitter assembly is disposed internal to and within the tubular connection. In one or more embodiments described above, further comprising a stabilizer disposed around the solenoid control assembly operable to protect the sleeve and the solenoid control assembly from contacting a wellbore. In one or more embodiments described above, wherein a first end of the sleeve is threadably connected to the solenoid control assembly. In one or more embodiments described above, wherein a second end of the sleeve is operable to engage a spline disposed on a tubular connection housing the mud motor. In one or more embodiments described above, wherein the stator solenoid winding transmitter assembly further comprises one or more winding taps operable to control the size and position of the generated magnetic field along the coil. In one or more embodiments described above, wherein the stator solenoid winding transmitter assembly further comprises solenoid protection electronics operable to control polarity of the generated magnetic field and tap selection, wherein the solenoid protection electronics comprises: a first switch operable to change the polarity of the generated magnetic field; a second switch operable to select one of the one or more winding taps; and a current protector. In one or more embodiments described above, wherein the solenoid control assembly further comprises a magnetometer operable to receive a generated magnetic field from a second bottom hole assembly.

Another embodiment of the present disclosure is a method of measuring a distance between a first wellbore and a second wellbore, comprising: energizing a stator solenoid winding assembly to generate a magnetic field, wherein the stator solenoid winding transmitter assembly is disposed around a mud motor of a bottom hole assembly disposed within a first wellbore; receiving the generated magnetic field by a magnetometer or magnetic gradiometer disposed within a second wellbore; transmitting the received generated magnetic field to a controller as an electrical signal; and determining a distance measurement between the first wellbore and the second wellbore based on the electrical signal.

In one or more embodiments described in the preceding paragraph, wherein the mud motor is disposed within a tubular connection between the solenoid control assembly and a drill bit, wherein the stator solenoid winding transmitter assembly is disposed external to and around the tubular connection. In one or more embodiments described above, wherein the mud motor is disposed within a tubular connection between the solenoid control assembly and a drill bit, wherein the stator solenoid winding transmitter assembly is disposed internal to and within the tubular connection. In one or more embodiments described above, further comprising determining a direction from the first wellbore to the second wellbore. In one or more embodiments described above, wherein the stator solenoid winding transmitter assembly comprises solenoid protection electronics operable to control polarity of the generated magnetic field and tap selection. In one or more embodiments described above, further comprising actuating a first switch of the solenoid protection electronics to change the polarity of the generated magnetic field. In one or more embodiments described above, further comprising actuating a second switch of the solenoid protection electronics to select one of one or more winding taps of the stator solenoid winding transmitter assembly to control the size and position of the generated magnetic field.

A further embodiment of the present disclosure is a non-transitory computer-readable medium comprising instructions that are configured, when executed by a processor, to: energize a stator solenoid winding assembly to generate a magnetic field, wherein the stator solenoid winding transmitter assembly is disposed around a mud motor of a bottom hole assembly disposed within a first wellbore; receive an electrical signal associated with the generated magnetic field received by a magnetometer disposed within a second wellbore; and determine a distance measurement between the first wellbore and the second wellbore based on the electrical signal.

In one or more embodiments described in the preceding paragraph, wherein the instructions are further configured to: determine a direction from the first wellbore to the second wellbore. In one or more embodiments described above, wherein the instructions are further configured to: actuate a first switch to change polarity of the generated magnetic field. In one or more embodiments described above, wherein the instructions are further configured to: actuate a second switch to select one of one or more winding taps of the stator solenoid winding transmitter assembly to control the size and position of the generated magnetic field.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method of determining a distance between a first wellbore and a second wellbore, comprising:
    energizing a stator solenoid winding transmitter assembly to form a first magnetic field, wherein the stator solenoid winding transmitter assembly is disposed around a mud motor of a bottom hole assembly disposed within the first wellbore,
    magnetizing at least a portion of the mud motor with at least the first magnetic field;
    forming a second magnetic field with at least the energized stator solenoid winding transmitter assembly and the magnetized portion of the mud motor;

receiving the second magnetic field with a magnetic field sensor or a magnetic gradient field sensor disposed within the second wellbore;

transmitting the second magnetic field to a controller; and determining the distance between the first wellbore and the second wellbore based at least in part on the second magnetic field.

2. The method of claim 1, wherein the mud motor is disposed within a tubular connection between a solenoid control assembly and a drill bit, wherein the stator solenoid winding transmitter assembly is disposed external to and around the tubular connection.

3. The method of claim 1, wherein the mud motor is disposed within a tubular connection between a solenoid control assembly and a drill bit, wherein the stator solenoid winding transmitter assembly is disposed internal to and within the tubular connection.

4. The method of claim 1, further comprising determining a direction from the first wellbore to the second wellbore.

5. The method of claim 1, wherein the stator solenoid winding transmitter assembly comprises solenoid protection electronics operable to control a polarity of the first magnetic field and a tap selection.

6. The method of claim 5, further comprising actuating a first switch of the solenoid protection electronics to change the polarity of the first magnetic field.

7. The method of claim 6, further comprising actuating a second switch of the solenoid protection electronics to select one of one or more winding taps of the stator solenoid winding transmitter assembly to control a size and a position of the first magnetic field.

8. The method of claim 1, further comprising steering a drill in the first wellbore based on the distance.

9. The method of claim 1, wherein the stator solenoid winding transmitter assembly comprises a coil comprising a plurality of windings and a sleeve, wherein the coil is disposed within the sleeve.

10. The method of claim 9, wherein a solenoid control assembly is disposed adjacent to the stator solenoid winding transmitter assembly.

11. The method of claim 9, further comprising stabilizing the stator solenoid winding transmitter assembly with one or more stabilizers.

12. The method of claim 9, wherein a first end of the sleeve is threadably connected to a solenoid control assembly.

13. The method of claim 12, further comprising engaging a spline disposed on a tubular connection housing the mud motor with a second end of the sleeve.

14. The method of claim 1, further comprising receiving an additional electrical signal associated with one or more ranging measurements from a transmitter proximate to a second bottom hole assembly.

15. The method of claim 14, wherein the second bottom hole assembly is disposed either in a different wellbore than the mud motor or at a surface location.

16. A non-transitory computer-readable medium comprising instructions that are configured, when executed by a processor, to:

energize a stator solenoid winding transmitter assembly to form a first magnetic field, wherein the stator solenoid winding transmitter assembly is disposed around a mud motor of a bottom hole assembly disposed within a first wellbore;

magnetize at least a portion of the mud motor with at least the first magnetic field;

form a second magnetic field with at least the energized stator solenoid winding transmitter assembly and the magnetized portion of the mud motor;

receive the second magnetic field with a magnetic field sensor or a magnetic gradient field sensor disposed within a second wellbore; and determine a distance measurement between the first wellbore and the second wellbore based at least in part on the second magnetic field.

17. The non-transitory computer-readable medium of claim 16, wherein the instructions are further configured to:

determine a direction from the first wellbore to the second wellbore.

18. The non-transitory computer-readable medium of claim 16, wherein the instructions are further configured to:

actuate a first switch to change a polarity of the first magnetic field.

19. The non-transitory computer-readable medium of claim 18, wherein the instructions are further configured to:

actuate a second switch to select one of one or more winding taps of the stator solenoid winding transmitter assembly to control a size and a position of the first magnetic field" in order to avoid clarity issues (e.g., which magnetic field (first or second)?) and provide appropriate antecedence basis.

20. The non-transitory computer-readable medium of claim 16, wherein the instructions are further configured to:

steer a drill in the first wellbore based on the distance measurement.

* * * * *